United States Patent [19]

Pollock et al.

[11] 4,340,484
[45] Jul. 20, 1982

[54] METHOD FOR THE FROTH FLOTATION SEPARATION AND TREATMENT OF SLOWLY BIODEGRADABLE COMPONENTS IN WASTE TREATMENT

[75] Inventors: David C. I. Pollock, Richmond Hill; Malcolm A. Wilson, Vegreville, both of Canada

[73] Assignee: C-I-L Inc., North York, Canada

[21] Appl. No.: 264,839

[22] Filed: May 18, 1981

Related U.S. Application Data

[63] Continuation-in-part of Ser. No. 159,351, Jun. 13, 1980, abandoned.

[30] Foreign Application Priority Data

Oct. 26, 1979 [CA] Canada .................................. 338536

[51] Int. Cl.³ .............................................. C02F 3/22
[52] U.S. Cl. ................................... 210/607; 210/608; 210/627
[58] Field of Search ............... 210/607, 608, 623, 624, 210/625, 626, 627, 628, 703, 704, 705, 706, 707, 221.1, 221.2

[56] References Cited

U.S. PATENT DOCUMENTS

| | | | |
|---|---|---|---|
| 3,203,893 | 8/1965 | House | 210/608 |
| 3,224,964 | 12/1965 | Derenk | 210/608 |
| 3,247,104 | 4/1966 | Sato | 210/608 |
| 3,248,324 | 4/1966 | Sweeney | 210/608 |
| 3,264,213 | 8/1966 | Pav | 210/608 |
| 3,275,149 | 9/1966 | Ludwig | 210/608 |
| 3,390,076 | 6/1968 | Dubach | 210/608 |
| 3,617,539 | 11/1971 | Grutsch | 210/608 |
| 3,745,113 | 7/1973 | Fuchs | 210/608 |
| 4,086,160 | 4/1978 | Roesler | 210/608 |
| 4,120,765 | 10/1978 | King | 210/608 |

FOREIGN PATENT DOCUMENTS

| | | | |
|---|---|---|---|
| 1033081 | 6/1978 | Canada | 210/608 |
| 955321 | 4/1964 | United Kingdom | 210/608 |
| 7709551 | 2/1980 | Sweden | 210/608 |

Primary Examiner—Ernest G. Therkorn

[57] ABSTRACT

In a long vertical shaft bioreactor for the treatment of degradable wastes in a circulating loop, a process is provided for separating and treating the slowly biodegradable components of the waste. The process comprises the steps of aerating and oxidizing the waste liquor in the reactor to produce an effluent and a foam which foam contains the slowly biodegradable components, which have not been degraded in the oxidizing step, separating and collecting the foam, collapsing the foam and subjecting the collapsed foam to further aeration/oxidation treatment to produce a treated effluent. The thus further treated effluent is returned to the bioreactor for reprocessing.

1 Claim, 4 Drawing Figures

METHOD FOR THE FROTH FLOTATION SEPARATION AND TREATMENT OF SLOWLY BIODEGRADABLE COMPONENTS IN WASTE TREATMENT

This application is a Continuation-in-Part application of U.S. application Ser. No. 159,351, filed on June 13, 1980, now abandoned.

This invention relates to a method for separating the difficulty biodegradable components of liquidborne municipal and industrial biologically-degradable waste, referred to hereinafter as sewage, and treatment of the same.

The methods generally employed in the treatment of sewage comprise a primary treatment by mechanical separation of gross solids followed by a second treatment by an activated sludge process by which the sewage, in the presence of biomass, nutrient and oxygen, is biologically degraded to form carbon dioxide, water and more biomass and a cellular material that forms a sludge. The oxygenation of the sewage is usually carried out either by aeration in surface lagoons, large tanks or in a long vertical shaft bioreactor such as is disclosed in Canadian Pat. No. 1,033,081 to Bailey et al. The sludge produced in these methods is commonly separated by flotation or sedimentation and a clarified effluent is discharged in a natural water course.

The acceptability for the discharge of the effluent from a secondary waste water treatment process is determined in terms of its total five day biochemical oxygen demand (B.O.D.$_5$) value and its suspended solids (S.S.) content. Maximum acceptable standards of these values, as established in several jurisdictions, are as follows:

| JURISDICTION | SECONDARY EFFLUENT OBJECTIVES | |
| --- | --- | --- |
| | B.O.D.$_5$ (total) | S.S. |
| U.S. EPA Secondary effluent standards | 30 mg/l | 30 mg/l |
| Environment Canada | 30 mg/l | 30 mg/l |
| Ministry of Environment Ontario, Canada | 15 mg/l | 15 mg/l |
| U.K. Royal Commission Standards | 15 mg/l | 25 mg/l |

The total B.O.D.$_5$ value of the treated effluent consists of two parts, namely, that part comprising the soluble material and the very fine, dispersed insoluble material and that part comprising the suspended, courser solid material. The latter accounts for about 30% to 50% of the total B.O.D.$_5$ value while the soluble portion accounts for up to 70% of the B.O.D.$_5$ value. Thus in most jurisdictions a treated effluent having a soluble B.O.D.$_5$ value of 5 to 10 mg/l is deemed acceptable.

In order to achieve the above-noted effluent objectives, account must be taken of the make-up of the sewage in order to provide adequate treatment facilities and operating procedures. The biologically degradable fraction of sewage for treatment comprises both readily biodegradable and nonreadily or difficulty or slowly biodegradable materials. Generally it has been necessary to design and operate sewage treatment facilities to reduce the slowly-biodegradable material to the acceptable B.O.D.$_5$ values. Thus the volume of material treated, the size of the treatment facility, the treatment time and the air (oxygen) consumption have all been adapted to the treatment of the slowly-biodegradable fraction even though this material may occupy only a small part of the total sewage mixture. The design and construction of a treatment plant has therefore generally been dictated by the quantity of a minor, slowly-degradable component of the sewage, typically not more than 5% by volume.

It has been observed that foams which are produced during the aeration of sewage tend to contain a large percentage of the slowly biodegradable portion of the sewage. It is believed that aeration of sewage results in foam fractionation of the sewage which fractionation concentrates the slow-to-degrade materials in the foam. These foams originate mainly from surface active components which are invariably present in sewage and their presence limits the waste treatment process to sewage liquors having certain maximum food-to-biomass (F/M) ratios. This limitation is a particularly important factor in the operation of a plug flow reactor such as a long vertical shaft bioreactor. Consequently any procedure for segregating and reserving the foams, which contain most of the slowly degradable material, for special treatment will provide a means for increasing the amount of sewage which can be processed in a given bioreactor.

The process of the present invention provides a means for separating foams produced during aeration of sewage and for the aerobic treatment of the slowly biodegradable waste contained therein in a modified activated sludge waste treatment method wherein an aerobic biological reaction takes place during the continuous circulation of fluid waste in an apparatus comprising a surface basin, a long vertical downcomer chamber, a long vertical riser chamber operatively communicating with the downcomer through the basin and at the lower end of the downcomer to form a circulating loop and including means to circulate waste liquor through said loop in the presence of oxygen-containing gas. The process permits a reduction in the size of a sewage treatment plant and a reduction in the aeration and mixing energy needed to operate it, resulting in a process that is more economic in both capital and operating costs. The process of the invention comprises the steps of:

(a) introducing waste liquor from a single source into the riser chamber of the circulating loop in a long vertical shaft bioreactor, (b) adding oxygen-containing gas to the waste liquor in the riser chamber to lift the waste liquor for circulation through the loop and to provide oxygenation of the waste, (c) collecting from the surface of the waste in a surface basin at the top of the riser chamber any foam containing slowly biodegradable materials together with activated sludge, which foam has been produced by stripping the supersaturated dissolved gases ascending from depth in the circulating loop by the action of the added oygen-containing gas in the riser, (d) separating the foam and contained slowly biodegradable materials and its contained activated sludge from the surface of the liquid waste in the basin and transferring the foam and contained materials to a foam oxidation vessel where the foam is collapsed, (e) aerating the collapsed foam in the foam oxidation vessel to produce a further biodegraded liquid and solids mixture, and (f) returning the further biodegraded liquids and solids mixture from step (e) to the circulating waste in the loop via step (a).

In the practice of the process of this invention, de-gritted sewage influent is fed into a primary treatment stage, if necessary. After primary treatment the sewage is subjected to intense aeration in a secondary stage in the vertical shaft bioreactor. The residence time in the secondary stage is short and thus only rapidly biodegradable components of the sewage are affected. Some of the more slowly biodegradable components of the sewage will be floated to the surface in the foam which is generated during aeration. This foam is collected in an adjoining reactor (aerator) of such size that sufficient retention time (several multiples of the secondary stage retention time) is provided for the foam to collapse and react with biomass that is either carried to the reactor along with the foam or provided by recycling biomass-containing sludge from a later clarification stage. After treatment, the collapsed foam material is returned to the secondary stage where any undegraded material is reprocessed by subjecting it to aeration, foaming and further treatment. From the secondary stage, the mixed liquor containing suspended solids is diverted to a clarification stage.

An alternate process as described, for example, by Sweeney in U.S. Pat. No. 3,248,324 provides a primary treatment in which all the influent raw sewage is first aerated in the absence of biomass, which treatment produces a surface foam and a residual sewage. The fractionated foam produced in this primary treatment is then transferred to a reaction vessel for special aerobic digestion in the presence of biomass and special nutrients where a unique bacteria culture is used to cope with the hard-to-degrade organic material in the foam. The unfoamed, residual raw sewage is sent for conventional treatment. In the process described by Sweeney, foaming surfactants are deliberately separated from the mass of raw sewage and subjected to special degradation treatment requiring special process equipment and the expenditure of additional energy.

The invention is illustrated by the accompanying drawings wherein

Figure 1:
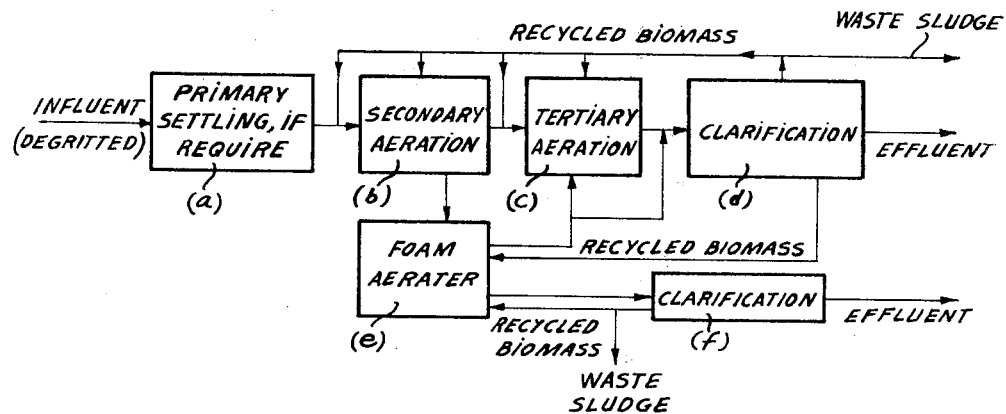
FIG. 1 is a flow sheet of a preferred embodiment of the process of this invention.

Referring to the drawings, in the process illustrated by FIG. 1, de-gritted sewage influent is first subjected to a primary treatment step (a) where separation of solids by any conventional settling or flotation process suitable to the application may be used. From step (a) the influent passes to a secondary aeration stage (b) where means are provided for vigorously aerating the mixed liquor comprising influent and biomass furnished by a recycle stream. The foam generated is transferred to foam aerator (e) where it will collapse and be aerated in the presence of biomass. The biomass in the foam aerator is present as a result of being carried over with the foam from stage (b) or it may be furnished by a recycle stream. After aeration in (b) the foamfree mixed liquor passes to a tertiary aeration stage (c) where it is subjected to prolonged aeration. From the tertiary aeration stage (c) the mixed liquor passes to a clarification stage (d) wherein any conventional settling or flotation procedure may be used to separate the biomass from the effluent of stage (c). Means are provided to recycle biomass from clarification to (b), (c) and (e), to the inlets of (b), (c) and (e) and to waste sludge. Effluent from foam aerator (e) may be discharged into tertiary aerator (c) or the latter's clarifier (d). A separate clarification stage (f) may be provided, if desired, for the treated sludge from foam aerator (e).

Figure 2:
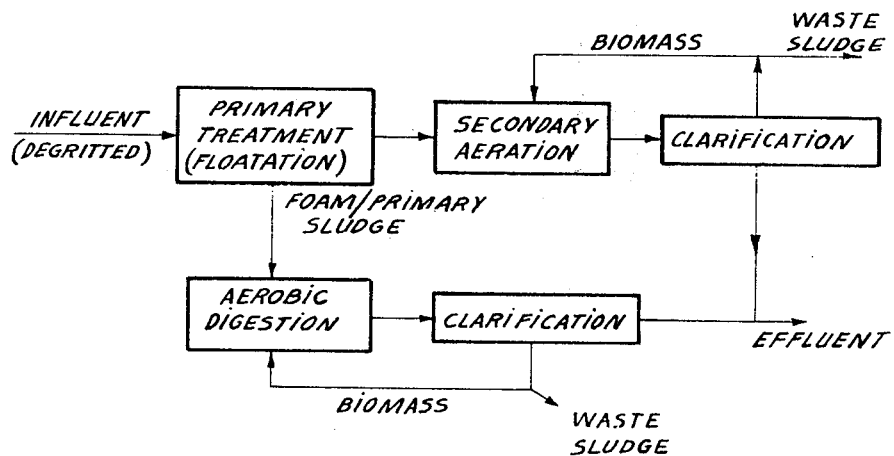
FIG. 2 is a flow sheet of a proposed alternative embodiment.

In the process illustrated in FIG. 2, de-gritted influent passes first to a primary treatment stage that serves also to separate solids by flotation. Foam and solids from the primary treatment are transferred to a separate aerobic digester for aeration in the presence of biomass and nutrient. Liquid from the primary treatment passes to an aerator for secondary treatment with an oxygen-containing gas in the presence of biomass and nutrient. Both the aerobic digester and the secondary aerator discharge into their respective clarifiers, both of which have means for recycling biomass and discharging waste sludge.

Figure 3:
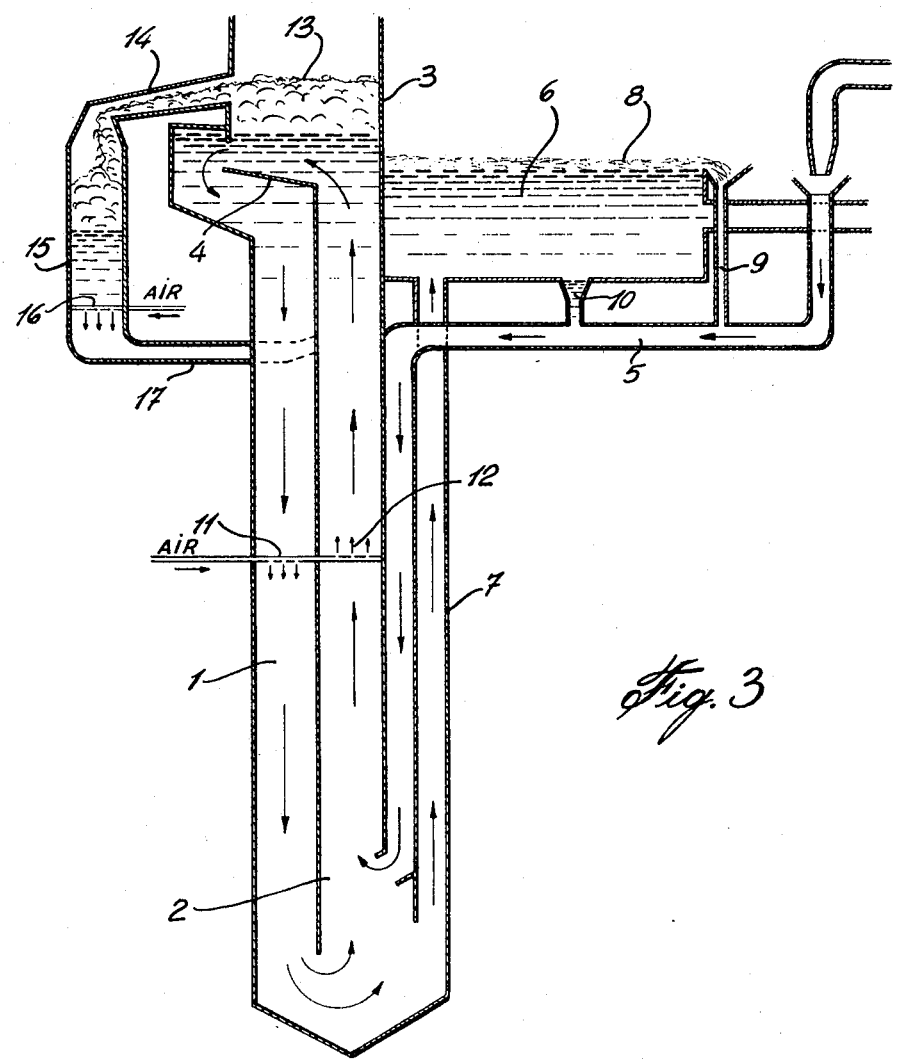
FIG. 3 is a diagrammatic elevation of a long vertical shaft bioreactor adapted to carry out separation of slowly biodegradable components by a foam flotation procedure.

FIG. 3 shows a long vertical shaft bioreactor having a downcomer chamber 1 and a riser chamber 2 communicating at their lower and upper ends, the upper ends communicating through a basin 3. Baffle 4 directs the flow across the basin. Sewage water enters the riser chamber 2 by way of influent duct 5. Effluent is discharged into flotation tank 6 through effluent duct 7. Sludge 8, floated to the surface of tank 6 is recycled to influent duct 5 through duct 9. Sedimented sludge is recycled through duct 10. An oxygen-containing gas, usually air, is injected into downcomer chamber 1 through sparger 12. Aeration of the sewage and included biomass and nutrients brings about the biodegradation of the sewage. The aeration, together with a stripping action of air coming out of solution in the form of minute bubbles forms a foam 13 which collects on the surface of the liquid in basin 3 which foam contains a major portion of the slowly biodegradable components of the sewage. Foam 13 flows through foam duct 14 to foam aerator 15 where it collapses under its own weight to form a liquid which is oxidized by an oxygen-containing gas (air) injected into the aerator 15 through sparger 16. The oxidized product is recycled by duct 17 to riser chamber 2 for further treatment.

The apparatus of FIG. 3 is adapted to carry out the process illustrated in the flow sheet of FIG. 1. The downcomer/riser circulatory system performs the functions of secondary aeration (b) and tertiary aeration (c). Foam aerator 15 corresponds to foam aerator (e). Flotation tank 6 corresponds to clarification stage (d). Recycle streams from flotation tank 6 and foam aerator 15 are also present in the apparatus of FIG. 3.

Figure 4:
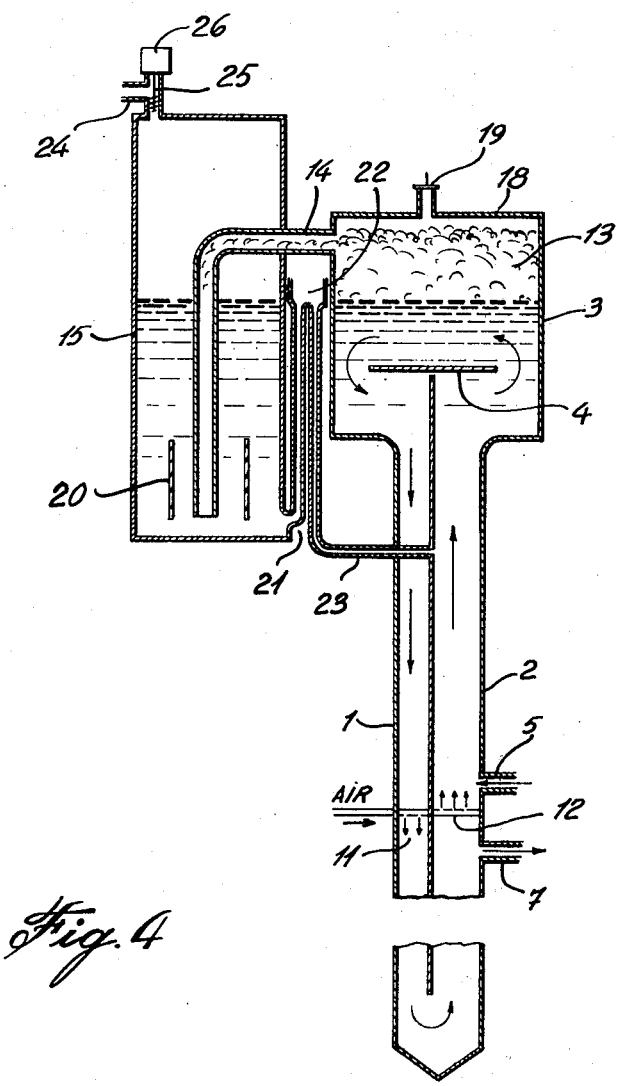
FIG. 4 is a diagrammatic elevation of a long vertical shaft bioreactor fitted with an enclosed pressurized head tank and connected foam oxidation tank suitable for carrying out the foam flotation procedure of this invention.

FIG. 4 shows a long vertical shaft bioreactor which is analogous to that of FIG. 3 with downcomer 1, raiser 2, influent duct 5, effluent duct 7 and gas spargers 11 and 12. However, it differs in respect to the basin 3 and foam aerator 15. Basin 3 is fitted with a cover 18 thereby converting it into a pressurized vessel. A pressure release valve is shown at 19. Foam duct 14 discharges beneath the surface of the liquid in foam aerator 15 so that the foam is collapsed and the collapsed foam and oxygen-containing gas are forced out beneath the head of liquid in aerator 15. Thus advantage is taken of existing air collected from within the pressurized basin 3 in order to further oxygenate the collapsed foam in aerator 15. Draft tube 20 aids in mixing the gas with the contents of aerator 15. Treated liquor from aerator 15 is recycled to riser 2 through line 21 leading to overflow pot 22 which discharge through line 23 to the riser. The height of overflow pot 22 is adjustable.

Foam aerator 15 is vented to atmosphere through vent pipe 24 which is fitted with a rotating defoamer device 25 actuated by a motor 26.

Foam aerator 15 of FIG. 4 carries out the function of foam aerator (e) of FIG. 1 using a pressurized system.

A long vertical shaft bioreactor can be employed to carry out the process illustrated in the flow sheet of FIG. 2. To achieve this, foam-free effluent from the primary flotation stage serves as the influent to the vertical shaft bioreactor, while foam from the primary floation stage is permitted to collapse under its own weight and is then injected into the bioreactor riser.

The advantages in carrying out separation of foam in parallel with the biological treatment process may be summarized as follows:

(a) Many slowly biodegradable materials in the sewage are removed by the foam and are oxidized by subjecting them to a longer residence time in a separate foam aerator, thus reserving the operation of the main bioreactor to treatment of the readily biodegradable material. This permits the operation of the process at a higher food-to-biomass (F/M) ratio.

(b) Many readily biodegradable materials in the sewage which are capable of forming foams are biodegradable during aeration in the bioreactor and thus are not carried into the foam aerator, thus minimizing the load on the foam aerator and, as a result, its size.

(c) Foam generated during aeration in the bioreactor contains biomass which is carried over into the foam aerator and in many cases the foam aerator will need no further biomass addition. In this event the mixed liquor effluent from the foam aerator can be transferred, after residence time in the foam aerator sufficient to biodegrade the foam, to the bioreactor for further aeration.

The following example demonstrates the effectiveness of the foam-separation step in the process of the present invention.

EXAMPLE

In a long vertical shaft bioreactor in which the shaft had an outside diameter of 16 inches and a depth of approximately 500 feet and which contained a concentrically placed downcomer chamber of about 10 inch diameter, municipal sewage was treated by being circulated through the bioreactor at a rate of about 0.1 million gals (Imp.) per day. The influent waste stream had a total BOD of from 150-300 ppm and a total COD of from 400-600 ppm. During circulation of the waste, air was injected into the downflow stream at a rate of 6 SCFM and into the rising stream at a rate of 30 SCFM. A portion of the waste was drawn from the riser for flotation and sedimentation separation of sludge and sludge-free water was discharged into an adjacent conventional treatment facility. The above-described process was carried out for two separate five-day continuous periods. During one period, the foam separation and treatment vessel (the foam tank) of the present invention was employed. During the second period no such foam tank was used. With the foam tank in service, it was found from a continuous monitoring analysis of the effluent stream that the soluble biological oxygen demand (SBOD) remained constant over the five day period at about 19 ppm and the soluble chemical oxygen demand (SCOD) decreased from 275 ppm (day 1) to about 100 ppm (day 5). Bypassing the foam tank, the SBOD increased from 16 ppm (day 1) to 33 ppm (day 5) and the SCOD rose from 100 ppm to 150 ppm over the five day period. Thus it is seen that use of the separate foam treatment vessel permitted the more efficient functioning of the bioreactor by removing from the waste stream the foam component containing the slowly biodegradable constituents.

What we claim is:

1. In a modified activated sludge waste treatment method wherein an aerobic biological reaction takes place during the continuous circulation of fluid waste in an apparatus comprising a surface basin, a long vertical downcomer chamber, a long vertical riser chamber operatively communicating with the downcomer through the basin and at the lower end of the downcomer to form a circulating loop and including means to circulate waste liquor through said loop in the presence of oxygen-containing gas, the improvements whereby the slowly biodegradable components of the waste may be separated from the waste liquor in the loop, aerobically treated, and after treatment returned to the waste liquor in the loop, comprising the steps of:

(a) introducing waste liquor from a single source into the said riser chamber of the said loop, (b) adding oxygen-containing gas to the waste liquor in the said riser chamber to lift said waste liquor for circulation through said loop and to provide oxygenation of the said waste, (c) collecting from the surface of said waste in the said surface basin any foam containing slowly biodegradable materials together with activated sludge, which foam has been produced by stripping the supersaturated dissolved gases ascending from depth in the said circulating loop by the action of the said added oxygen-containing gas in the said riser, (d) separating said foam and contained slowly biodegradable materials and activated sludge from the surface of the liquid waste in the said basin and transferring said foam and contained materials to a foam oxidation vessel, (e) aerating said foam in said foam oxidation vessel to produce further biodegraded liquid and solids mixture, and (f) returning the said further biodegraded liquids and solids mixture from step (e) to the circulating waste in the said loop via step (a).

* * * * *